Aug. 10, 1948.  P. M. FARMER  2,446,643
SELECTIVE CONTROL SYSTEM FOR DISPENSING APPARATUS
Filed March 13, 1942  6 Sheets-Sheet 1
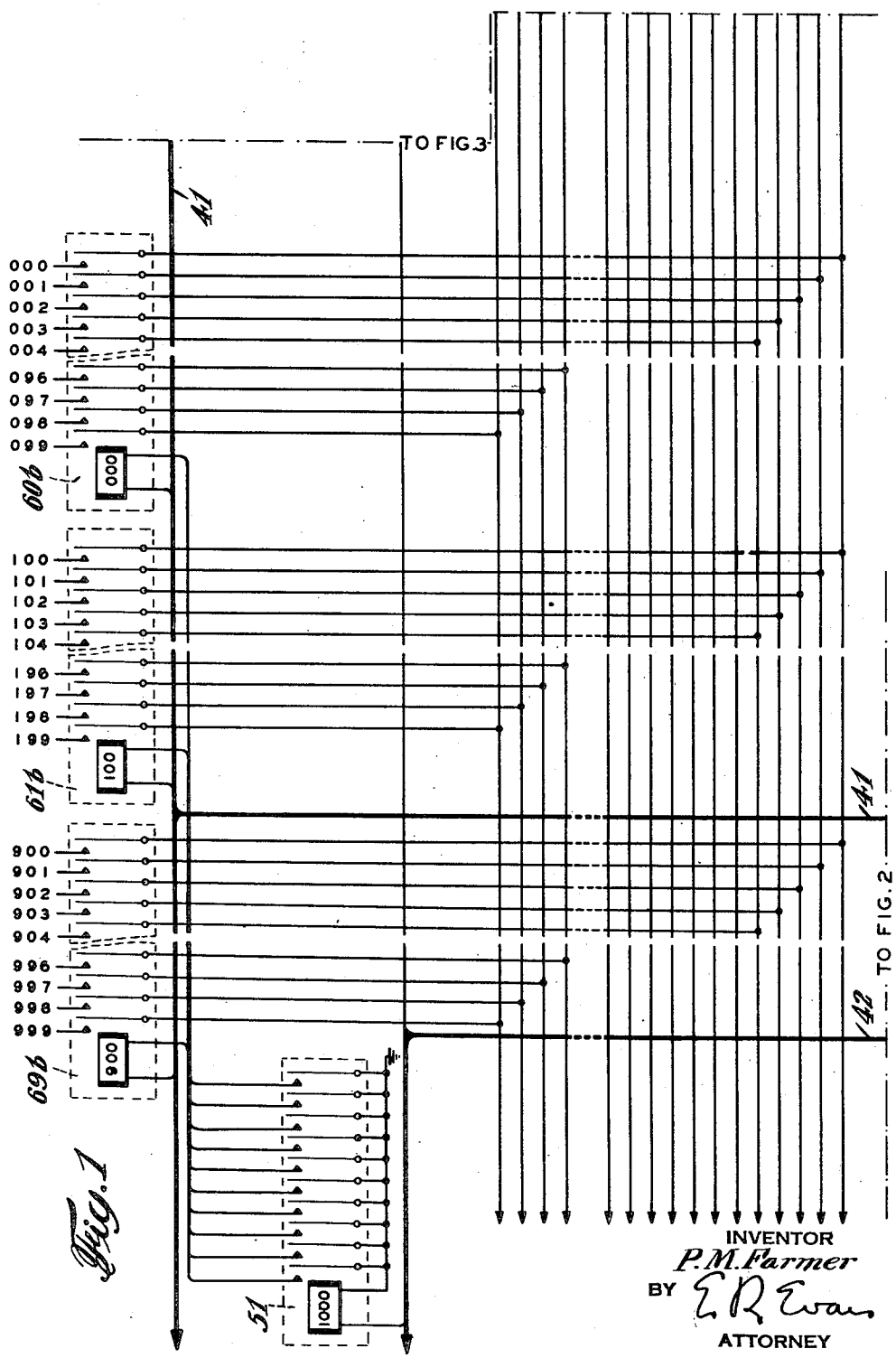
INVENTOR
P. M. Farmer
BY E. R. Evans
ATTORNEY

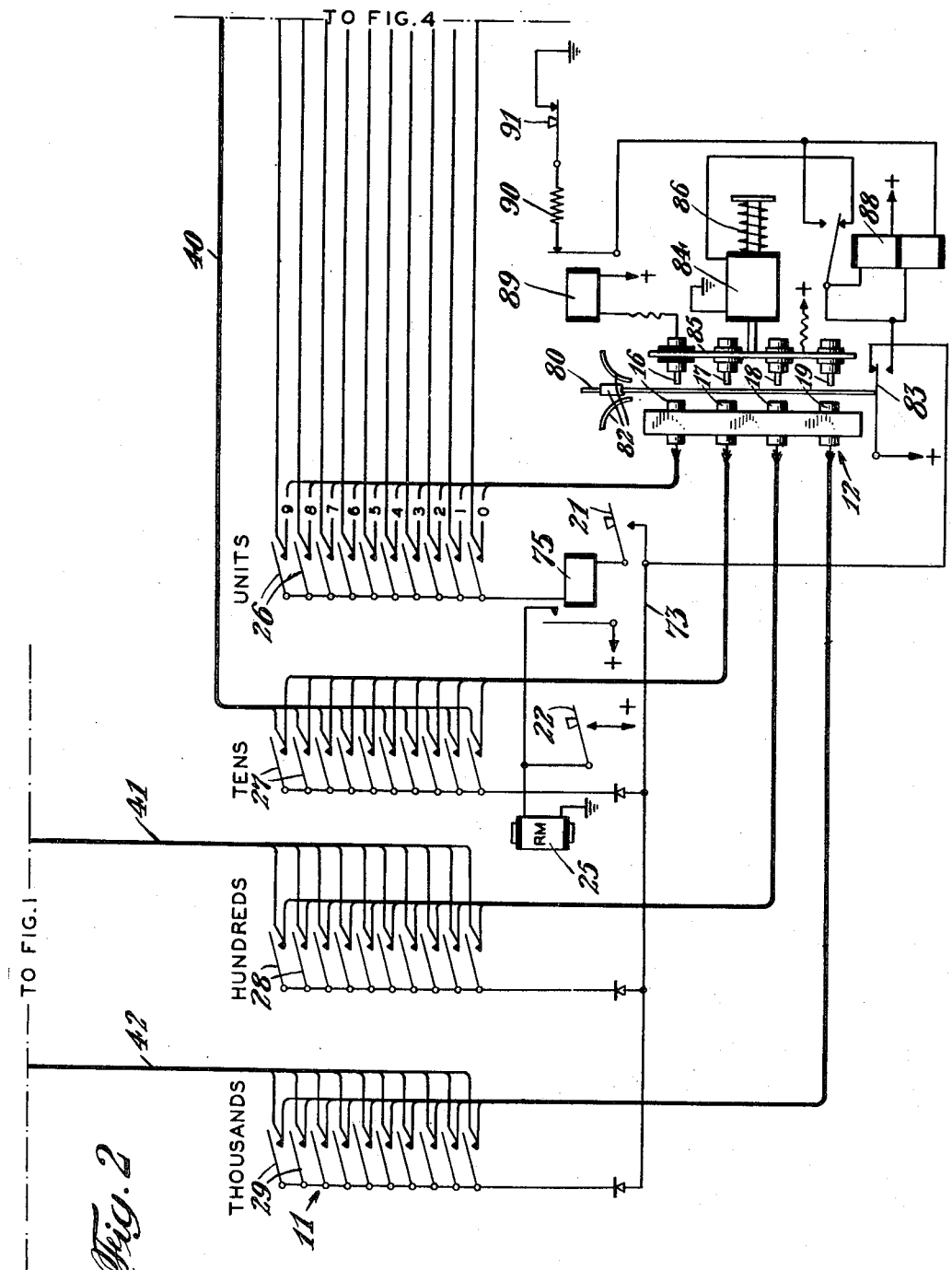

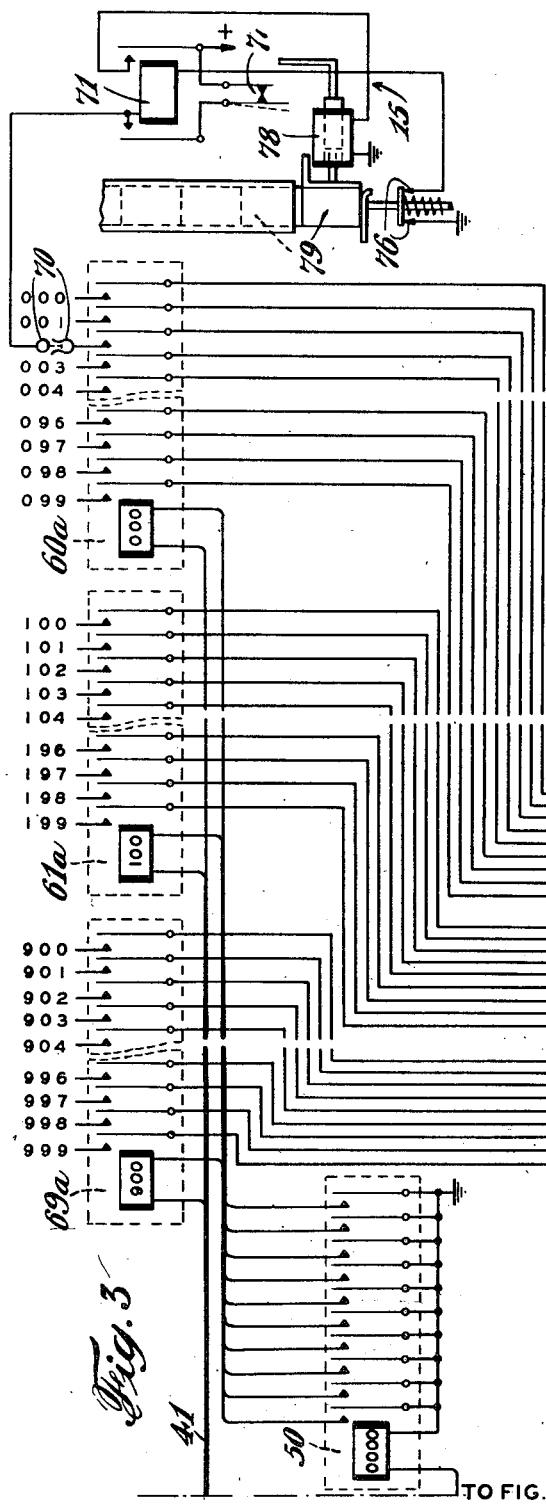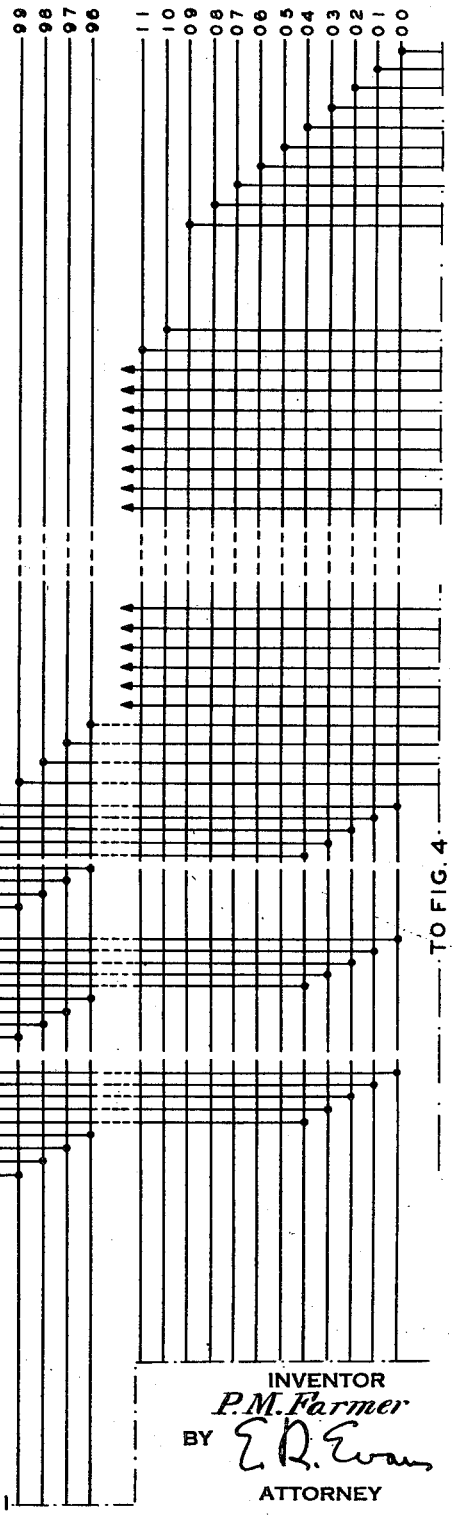

Aug. 10, 1948.   P. M. FARMER   2,446,643
SELECTIVE CONTROL SYSTEM FOR DISPENSING APPARATUS
Filed March 13, 1942   6 Sheets-Sheet 4
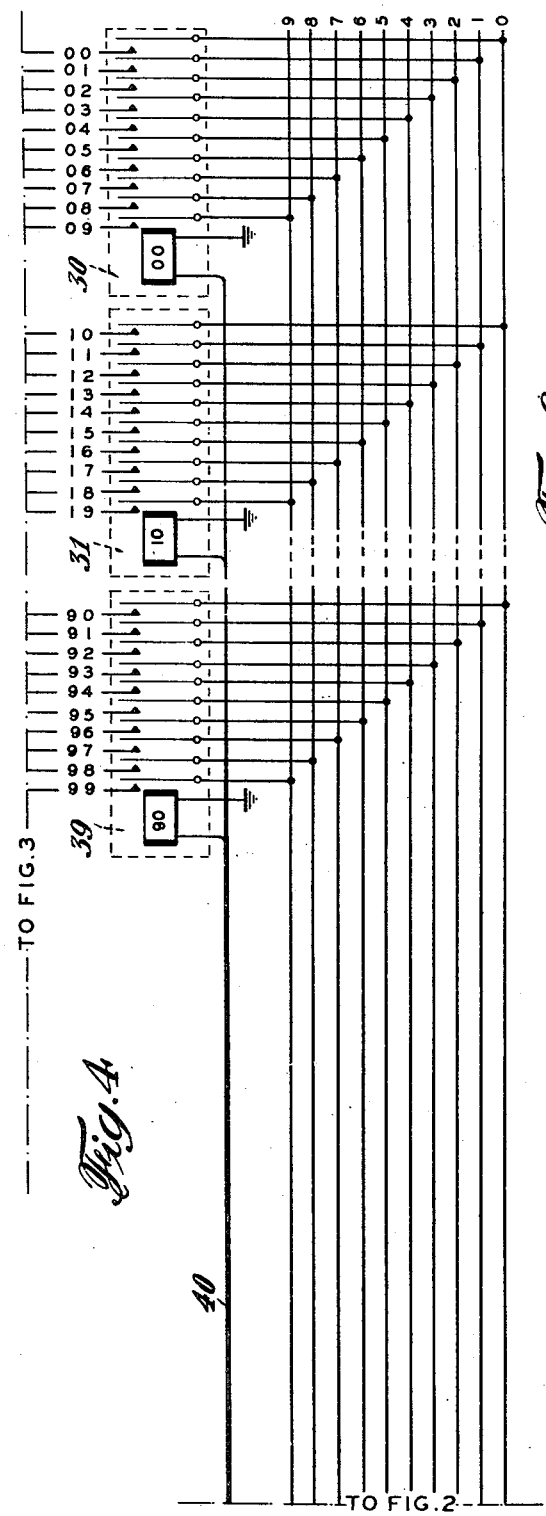
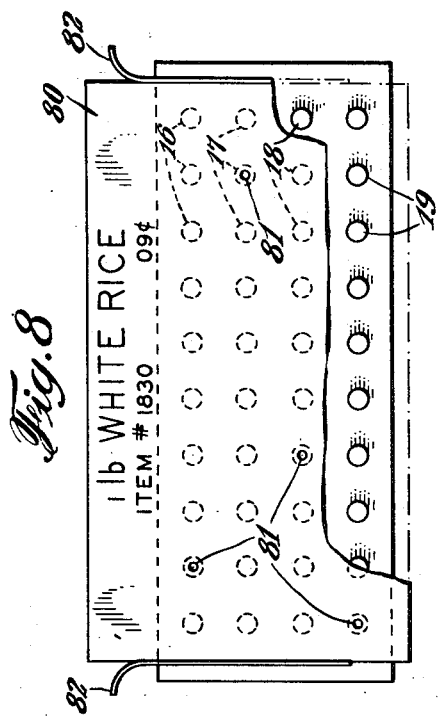
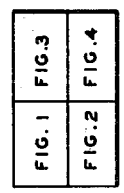
INVENTOR
P. M. Farmer
BY
ATTORNEY

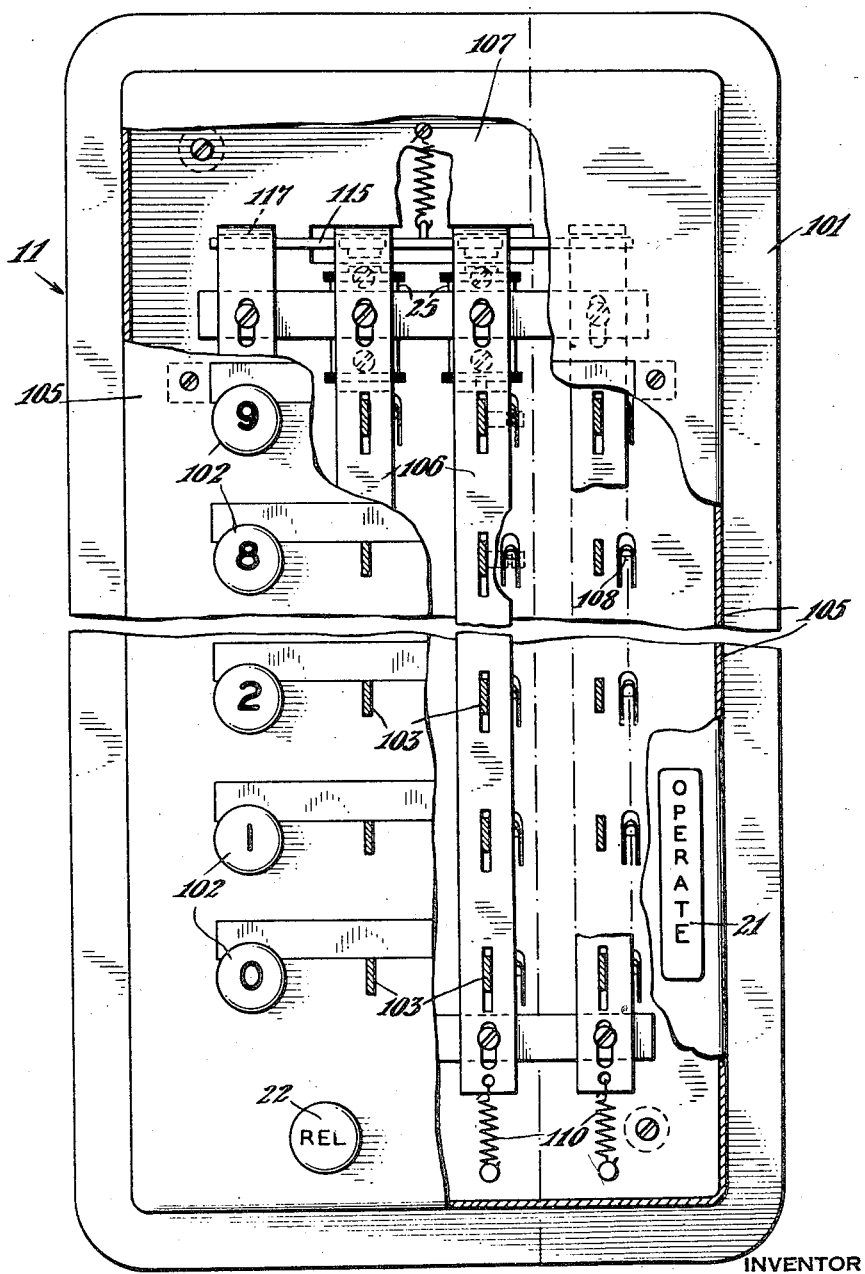

Aug. 10, 1948.    P. M. FARMER    2,446,643
SELECTIVE CONTROL SYSTEM FOR DISPENSING APPARATUS
Filed March 13, 1942    6 Sheets-Sheet 6
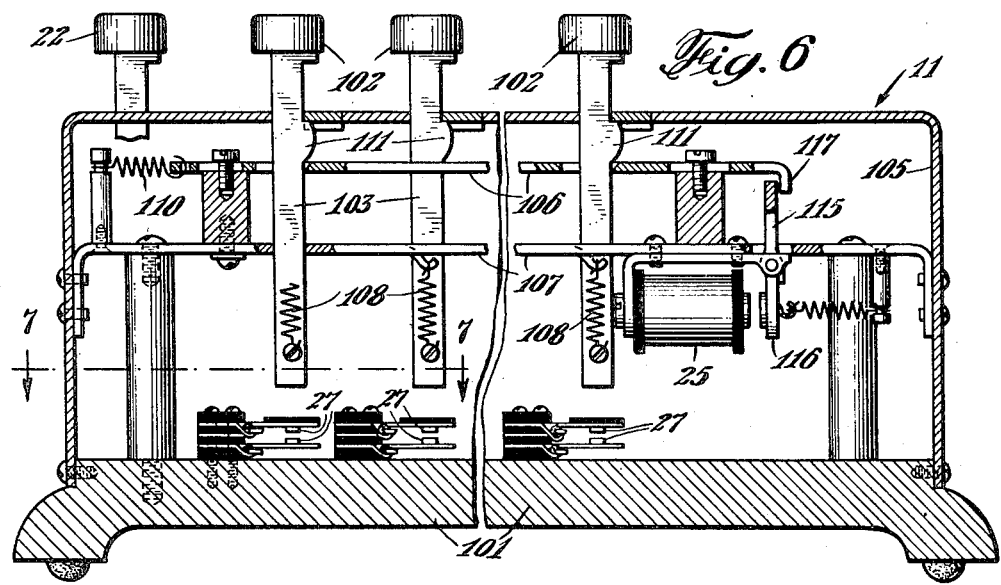
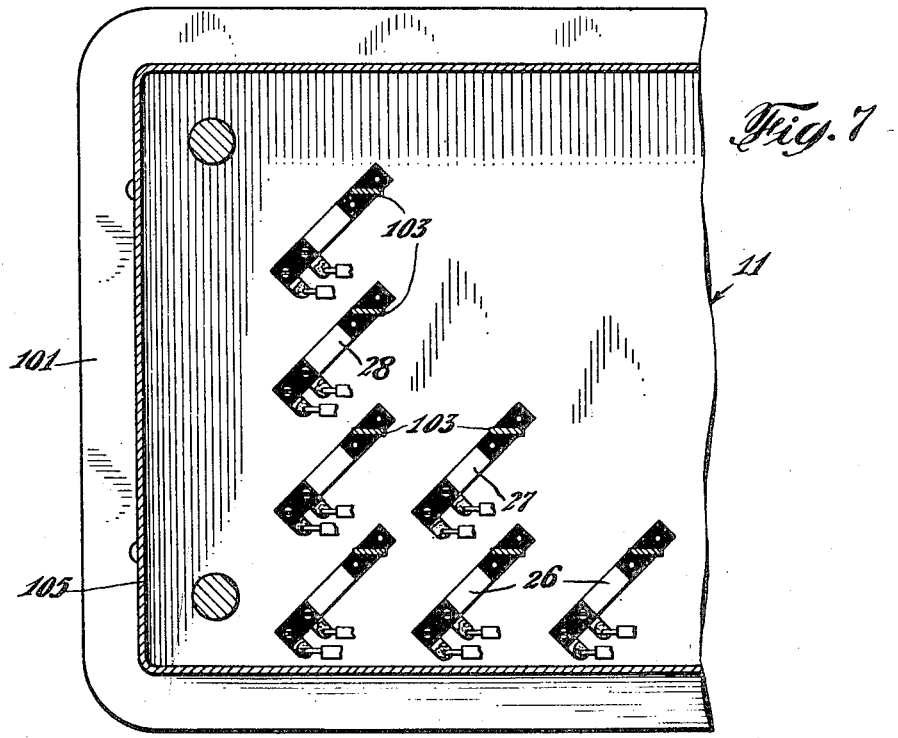
INVENTOR
P. M. Farmer
BY
ATTORNEY Patented Aug. 10, 1948

2,446,643

UNITED STATES PATENT OFFICE 2,446,643

SELECTIVE CONTROL SYSTEM FOR DISPENSING APPARATUS

Paul M. Farmer, Maplewood, N. J.

Application March 13, 1942, Serial No. 434,550

11 Claims. (Cl. 177—353)

This invention relates to electrical control systems and apparatus, and more particularly to selective control or actuating means for effecting substantially instantaneous operation of any one of a large number of units arranged to dispense articles from stock. The invention will be described as embodied in mechanical dispensing and assembly systems for use in retail stores, wholesale establishments and the like, such as those disclosed in my prior Patent No. 2,276,293, issued March 17, 1942 (of which the present application is a continuation in part), and Patent No. 2,276,294, granted concurrently therewith.

In general terms, the object of the invention is to provide improved means for selectively operating in rapid succession any desired dispensing units of a group which may include several hundreds or thousands of units, under the control of a card-control mechanism or by the setting of a manual keyset or other similar control apparatus.

Another object of the invention is to provide a system of the character described which operates either in accordance with punched cards as control forms or alternatively by manual actuation of digit keys for selecting items for which punched cards are not available. In certain applications, such as for merchandise order assembly systems, both methods of control are desirable in a single installation.

Another object of the invention is to simplify systems of the character described to such an extent that the apparatus may be set up, maintained in adjustment and altered to meet changing conditions by comparatively unskilled help. The design and arrangement of the component elements of the system are such that the operation of the system and the manner of making changes and extensions therein will be obvious to those having elementary knowledge of electrical circuits.

Another object of the invention is to insure effective operation of the selected dispensing unit, as by maintaining power supply thereto until it operates, and to indicate at the control station that such operation has been effected, with lost time or delay in operation reduced to a minimum.

Another object of the invention is to indicate to the operator the functioning of the selective control apparatus.

A still further object of the invention is to provide, in systems of the character described, a positive indication or operation in response to special conditions that may be encountered, such as the selection of an empty dispensing unit or an item for which automatic delivery is not contemplated. This object preferably is accomplished by rendering the control system inoperative until the operator effects manual restoration, the control system being automatically restored to normal under usual conditions when the operation of the selected unit is accomplished.

As pointed out above, the present invention relates generally to systems and apparatus for selectively dispensing and assembling items or articles from stock, as in stores, mail-order houses and the like. It has been proposed to automatically dispense items by closing individual electrical switches, each controlling a magnet arranged to actuate a release to feed an item or package from a pile or stack. Such a control system, requiring as many control switches as there are magnets, becomes cumbersome and difficult to operate quickly and accurately when there is a substantial number of different items, and often an installation of this type involves several hundred or even several thousand different items. In the electrical signaling art, other selective control systems have been devised, some of which depend on coded or timed current impulses, varying strength or polarity of current, and so forth. Such systems are complex, require considerable maintenance and, in some cases, an appreciable period of time for effecting selection. In accordance with the present invention, these difficulties or limitations are overcome in a simple and effective manner.

Other objects and advantages of the invention will appear from the following description of the preferred embodiment thereof shown in the accompanying drawings, wherein:

Figs. 1–4, taken together, constitute a wiring diagram of a two-thousand unit system and illustrate the circuits of the manual keyset, card control mechanism, electromagnetic switches, and one of the dispensing units;

Figs. 5, 6 and 7 are detail views of a suitable construction for the manually operable keyset, Figs. 6 and 7 being sectional views taken on lines 6—6 of Fig. 5 and 7—7 of Fig. 6, respectively.

Fig. 8 is a view illustrating a punched card to be used as a control form, inserted in the card control mechanism of Fig. 2; and Fig. 9 is a view showing the relation of Figs. 1–4 when assembled to form a complete diagram.

Referring to Figs. 1–4 of the drawings, arranged as shown in Fig. 9, a manually operable keyset 11 and a card control mechanism 12, Fig. 2, are each arranged to select and operate any one of a multiplicity of dispensing elements 15 through the instrumentality of the electromagnetic switches or relays shown in Figs. 1, 3 and 4. The switches or selective multicontact relays of the "tens" group are shown in Fig. 4; of the first "thousand" group (0–999) in Fig. 3; and of the second "thousand" group (1000–1999) in Fig. 1. Thus, the capacity of the control system illustrated is two thousand dispensing elements, and for each additional thousand, a set of switches similar to that shown in Figs. 1 or 3 would be added, up to a total of ten thousand separate dispensing elements.

The keyset 11 and the card control mechanism 12 are intended for alternative operation, depending upon whether a card is available to operate the card control mechanism for any particular selection. The control units are designed to work together without interference, but either may be omitted without altering the operation of the selective system, and in some installations only one unit is employed. Both the keyset 11 and card control mechanism 12 include digital sets of contacts, which are developed in Fig. 2 in connection with the keyset, the sets being labeled "units," "tens," "hundreds" and "thousands," respectively. Accordingly, it will be apparent that when one contact of each of the four sets is closed, a number which corresponds to the particular numerical designation of the dispensing element to be selected will be set up on the keyset. In a similar manner the closure of one of the "units" contacts 16, one of the "tens" contacts 17, one of the "hundreds" contacts 18 and one of the "thousands" contacts 19 of the card control mechanism 12 will effect the same result as the setting up of the corresponding number on the keyset 11, since the contacts 16—19 are multipled to the contacts 26—29 of the keyset 11, as indicated.

The keyset 11 is also provided, in the embodiment shown for the purpose of explaining the invention, with an "operate' key 21, a "release" key 22 and a release magnet 25. As will be explained in connection with the description of Figs. 5 to 7, illustrating the detailed construction of the keyset, when one of the keys in any digital set is depressed to close the associated contact, the key is latched in a position to hold the contact closed. If the wrong key is depressed by mistake, the actuation of another key in the same digital set releases the key first operated. The release magnet 25 when energized restores all of the operated keys and/or contacts to normal.

The electromagnetic selective switches illustrated in Figs. 1, 3 and 4 are shown as electromagnetic multicontact relays of a conventional type. Other equivalent remote-controlled switches may be employed in lieu of the electromagnetic relays, such as relays which are operated by other than magnetic coils, cross-bar switches arranged for direct control in response to the closure of a circuit like an ordinary relay, et cetera.

The keyset contacts 26 of the "units" set are multipled to the contacts of the "tens" relays 30, 31, . . . 39, ten in number, and the coils of said relays are multipled through a cable 40 to the digital contacts 27 of the "tens" set. To simplify the drawing, only three "tens" relays are shown, the others being connected in a similar manner. In other words, the operation of the "0" key 27 operates relay 30, the operation of the "1" key 27 operates relay 31, and the operation of the "9" key 27 operates relay 39. With this arrangement, upon the closure of one of the "units" contacts 26 and one of the "tens" contacts 27, any one of a hundred circuits (which are labeled 00–99 in Fig. 4) will be closed, relays between 31 and 39 being omitted for the sake of clearness, as stated above.

The "hundreds" contacts 28 and the "thousands" contacts 29 of the keyset are multipled through cables 41 and 42, respectively, to the "hundreds" and "thousands" relays, shown in Figs. 1 and 3. Thus, the contacts 29 are connected to the coils of relays 50 and 51 so that either relay 50 or relay 51 will be operated, depending upon whether the "0" or "1" key 29 of the "thousands" group is depressed. Relay 50 controls the circuits of the "hundreds" relays 60a, 61a, . . . , Fig. 3, whereas the relay 51 controls the circuits of the "hundreds" relays 60b, 61b, . . . of the second "thousands" group, shown in Fig. 1. In order to simplify the drawing, only three of the "hundreds" relays in each group are shown. The energization of relay 50 connects ground potential to one side of the coils of all of the group of relays 60a, 61a, . . . 69a, but only one of said relays will be operated by reason of the connection of the other side of its coil through the cable 41 to the particular "hundreds" key 28 which is closed. Similarly, the relay 51 connects ground potential to one side of the coils of the relay 60b, 61b, . . . 69b, but only one of said relays will be operated, depending upon which of the "hundreds" keys 29 is closed. It will be apparent that this selective circuit arrangement may be readily expanded by the addition of other "thousands" relay groups, such as that shown in Fig. 1, and if the capacity required does not exceed 1,000 lines as originally installed, the switching apparatus of Fig. 1 could be omitted. The relay 50 of Fig. 2 could also be omitted in that case, and the connections from relays 60a to 69a, inclusive, permanently grounded.

The numbering of the lines of the first thousand is indicated in Fig. 3, and the numbering of the lines of the second thousand is indicated in Fig. 1. Each of said lines, or as many as required, may be arranged to control the operation of a dispensing element. To illustrate the operation of the system, a single dispensing element is shown connected to line 002. Preferably the lines of the selective system terminate on a suitable terminal board with detachable connections, such as plugs and jacks 70 (see Fig. 3), whereby the connections between the terminals of the switches and the controlled elements may be readily interchanged. These terminal boards may be component parts of the "hundreds" relays, and being thus associated with separate hundreds groups, the "setting up" of wiring connections to associate particular numbers with particular dispensing elements is greatly facilitated.

It will be noted that each "hundreds" relay 60a, 61a, and so forth, contains terminals of a group of circuits bearing consecutive numbers, and successive groups of circuits are preferably found on adjacent relays. This straight-forward grouping of the circuits simplifies the installation and testing of the switching relays and the circuits through their contacts, and facilitates expansion of the system by the addition of further switching equipment when required. Thus, the installation and maintenance of the equipment may be taken care of by relatively unskilled labor.

The manual operation of the selective control system in detail is as follows. When the keyset 11 is used, one of the keys in each digital set is closed to set up the assigned number of the dispensing unit which is to be operated. Each key and its associated contact when actuated is latched in the operated position. As shown, the contacts of the "tens," "hundreds" and "thousands" sets are connected through conductor 73 and the contact 83 of the card control mechanism to battery. Therefore, the closure of one of the "tens" contacts 27 connects battery directly to the coil of one of the "tens" relays 30, 31—39, and since the other terminal of said coil is grounded, the relay operates. In like manner, the closure of one of the "hundreds" contacts 28 connects battery directly to the coil of one of the "hundreds" relays 60a—69a, and to the corresponding one of the other "hundreds" relay groups 60b—69b, et cetera. The connection thus established becomes effective only within the particular "thousand" group which is actuated to operate relay 50 or 51, which completes circuits of those "hundreds" relays. The closure of one of the "thousands" contacts 29 applies battery directly to one of the "thousands" relays 50 or 51, and said relay becomes energized and connects the coils of all of the associate "hundreds" relays 60—69 to ground. However, only one of the "hundreds" relays operates, since the circuit of only one relay in the group is completed through the cable 41 and the operated one of the "hundreds" contacts 28. After the number has been set up on the keyboard, the "operate" key 21 is actuated, whereupon a circuit is closed from battery through the contact 83, the key 21, the winding of relay 75, the operated one of the contacts 26, one of the contacts of the energized one of the "tens" relays 30 to 39, and one of the contacts of the energized one of the "hundreds" relays, for example, relay 60a, Fig. 3, the winding of relay 71, associated with that particular dispensing element, and the contacts 76 to ground. The contacts 76 are provided for the purpose of indicating when the dispensing unit is empty, and in such case the contacts will be open and break the above-described circuit.

When this circuit is closed by the operation of the key 21, as described, relays 71 and 75 become energized and a circuit is closed through the armature and front contact of relay 75 for energizing the release magnet 25 to restore the keys of the keyset 11 which have been operated. The opening of the contacts of the keyset releases the "tens," "hundreds" and "thousands" relays, as well as control relay 75. Relay 71, however, locks up through its left hand armature and front contact and the limit switch contacts 77 to battery so that it remains energized until the dispensing mechanism has completed its operation. The contacts 77 are arranged to be operated when the dispensing plunger reaches the limit of its travel in the operating cycle. The relay 71 closes a circuit through its right hand armature and front contact for energizing the motor magnet 78 of the dispensing element, to eject or release the lowermost package 79. It will be apparent that a complete operation of the magnet core and plunger is insured by maintaining the power supply to said magnet until the contacts 77 are opened by the plunger, even though the selective control circuit which operated relay 71 may have been opened. The dispensing unit illustrated is intended to represent merely a typical construction that may be employed, but other electrically operated mechanisms may be substituted therefor. A preferred construction of a dispensing element which is particularly adapted for this application is disclosed in my prior Patent No. 2,353,394 granted July 11, 1944.

It will be apparent that the selective control means according to the invention provides a substantially instantaneous operation of the desired one of a large group of dispensing elements, that the complete operation of the selected element is insured although the selective control mechanism is quickly restored to normal, and that the restoration of the keys of the keyset indicates to the operator that the circuit to the selected dispensing element has been closed and the element operated. If the dispensing element is empty, or if the stock is low (in case contacts 76 are arranged to indicate low stock before the dispensing element is completely empty), the circuit of the release magnet 25 of the keyset will not be completed by the operation of the multicontact relays, and the keys remain depressed. This indicates immediately to the operator that the desired item was not delivered by the dispensing element, either because the dispensing element was empty, or a "blank" number set up on the keyset by mistake, or in some instances where no dispensing elements are provided for special items. The operator having been apprised of this condition so that he can take the required steps to obtain the article desired, the keyset may be released by closing the "release" key 22 to energize the release magnet 25. The resetting of the keyset also is not effected if one of the selective switches or circuits is defective or broken, thus immediately indicating this condition to the operator. During each operating cycle, therefore, the actual operation of all of the required group relays and the completion of the circuit to the desired dispensing element is indicated at the keyset, and occasional apparatus failures are quickly discovered. The selector keys 26, 27, 28 and 29 may be set up in any order or they may all be set up simultaneously. The keyset arrangement as later described herein is of such a character that mistakes which may have been made in actuating a wrong key in any column may be corrected merely by pressing the correct key in that column.

The card control mechanism shown in Figs. 2 and 8 is arranged to close one of the contacts 16—19 in each digital group upon the insertion of a card 80, whereupon the circuits of the remote control switches and of the selected dispensing element are closed in exactly the same manner as described above in connection with the keyset 11.

As shown in Fig. 8, the card 80 is provided with perforations 81 which are in alignment with the respective rows of contacts 16, 17, 18 and 19 when the card is inserted in the card control device. When the card 80 is inserted between the guides 82 in order to effect the selection of the desired item, the edge of the card actuates contact 83 to remove battery from the contacts of the keyset 11 and to energize a solenoid 84 arranged to actuate the movable selective contacts of the card control mechanism. The latter contacts are carried on a plate 85 attached to the core of the solenoid 84, the movable contacts 16 being insulated from said plate which is connected to battery potential. A retracting spring 86 is arranged to withdraw the movable contacts when the solenoid is deenergized. As indicated in Fig. 8, the card 80 may also bear the name, price, etc., of the article represented by the card.

Upon the insertion of the card 80 as described, a circuit is closed through the contact 83, the armature and front contacts of normally energized relay 88 and winding of the solenoid 84, whereupon the movable contacts 16 to 19 are actuated against the perforated card 80, thereby closing a circuit in each digital group of contacts, depending upon the positioning of the perforations in the card. Upon the energization of the "tens," "hundreds" and "thousands" switching relays, as described above in connection with the operation of the keyset 11, a circuit is closed from battery through the winding of relay 89, one of the contacts 16 and the contacts of the operated remote control switches to the selected dispensing element. The energization of relay 89 restores the card control mechanism and releases the card 80, which may then be withdrawn and another card inserted.

It will be noted that the winding of the solenoid 84 is normally connected to battery through the make contact and upper winding of the relay 88, but the resistance of said relay winding is sufficiently high to prevent the solenoid from operating. However, the depression of the contact 83 connects battery potential directly to the winding of the solenoid 84, as described above, and said solenoid becomes energized. When the contact 83 is depressed, the upper winding of relay 88 is short-circuited through said contacts, but the armature of said relay remains attracted by reason of the current flowing from battery through the contact 83, the lower winding of relay 88, the armature and back contact of relay 89, resistance 90 and the normally closed key 91 to ground. When relay 89 operates, the circuit of the lower winding of relay 88 is interrupted at the contacts of said relay 89, and relay 88 becomes deenergized to break the circuit of the solenoid 84. When the armature of relay 88 engages its back contact, it short-circuits the lower winding of said relay, and the relay remains deenergized, even though the contacts of relay 89 reclose. Thus, the solenoid 84 of the card control mechanism remains deenergized until the card 80 is withdrawn and another card inserted. As soon as the card 80 is withdrawn from the card control mechanism, the contact 83 is restored to the normal position shown, and relay 88 becomes energized through a circuit that may be traced from battery through the upper winding thereof, then through either the armature and back contact of said relay or the lower winding of said relay, and the armature and back contact of relay 89 to ground. If the relay 89 fails to operate as described above, because the dispensing element is empty, or the article selected is not available for delivery from a dispensing element, the card control mechanism may be reset by opening the key or switch 91. The fact that the card 80 is not released indicates to the operator that the item desired has not been dispensed. Furthermore, the operation of the keyset 11 is dependent upon the contact 83 of the card control mechanism 12. Even if one or more of the keys of the keyset have been operated, when a card is inserted in the card control mechanism, battery is removed from the contacts of the keyset, thereby releasing any relays which may have been operated by the keyset. This interlock prevents the possibility of false selections or faulty operation if both keyset and card control device are operated simultaneously, or one operated before the other is released. Thus, it will be seen that either the manually operable keyset 11 or the card control mechanism 12 may be employed at will without interfering with each other, and that in either case the operation of the selective switching means and the restoration of the control device is effected almost instantaneously. Furthermore, in each case the failure of the control apparatus to operate one of the dispensing elements is indicated to the operator immediately after the selection has been completed at the operator's station.

The detailed construction of the keyset and of the card control mechanism may be altered in various ways without departing from the scope of the invention, and numerous constructions which would be suitable with comparatively slight modifications for use in the system described are well-known in the art. For the sake of completeness, however, the detailed construction of a keyset that might be employed in the system is shown in Figs. 5, 6 and 7. The keyset shown comprises a base member 101, on which the movable keys or buttons 102 are mounted, said keys when depressed serving to close the contacts 26, 27, 28 and 29 to control the selective switches, as described above in connection with Figs. 1 to 4. The keys may be supported for movement in any suitable manner, and as shown, the shank portions 103 thereof extend through and are guided in slots in the cover 105, the spring-biased latch plate 106 and the spring-supporting plate 107. The depressed keys are restored by the restoring springs 108 when released by actuation of the latch plates 106. A latch plate 106 is provided for each digit row of keys and each latch plate is biased to the latching position by a spring 110. As shown, the shank portion 103 of each keybar is provided with a cam projection 111 which is adapted to operate the latch bar 106 to release any key in the same row which has previously been depressed, and to remain latched in its normal position by engagement with the underside of the latch plate, whereby a corresponding one of the control contacts 27 (see Fig. 6) remains closed until the key is released and reset by its spring 108. The latch bars 106 are all arranged to be actuated simultaneously by the pivoted extension 115 of the armature 116 of the release magnet 25, said extension engaging the projecting end portion 117 of each latch bar 106 when the armature is attracted by the release coil to move the latch bars simultaneously into a position where the operated key levers are all released. The keyset may also provide a mounting for the "operate" key 21 and the "release" key 22, as indicated in Fig. 5, or these keys may be mounted separately.

The selective control system for dispensing apparatus embodying the invention, on account of its simplicity and rapidity of operation, is particularly advantageous for use in retail stores, and wholesale and mail-order warehouses. The operating cycle, including manual operations and the actuation and restoration of the selecting apparatus, may be completed so quickly that 100 or more selections a minute may be readily attained. This speed of operation conserves the customer's time and reduces the expense for labor. Both the arrangement of the system and the operating procedure are so simple that installation, maintenance and operation of the system may be accomplished with comparatively unskilled labor. The selective switching apparatus, preferably comprising groups of multicontact relays, provides a flexible arrangement which may be readily changed for changes in merchandise or dispensed items, or expanded to meet increased demands.

The invention is not limited to the detailed construction and arrangement of parts which have been illustrated and described above for the purpose of explaining the invention, inasmuch as modifications thereof will occur to those skilled in the art. Numerous alterations and rearrangements of the structural details and connections, some of which are referred to above, may be made without departing from the scope of the invention as defined in the appended claims.

I claim:

1. In a selective control means for article-handling systems of the class described, a selectively operable control device having digital sets of contacts to be operated in accordance with the assigned number of the article-dispensing element desired, electromagnetic switches connected to be selectively operated thereby to establish an operating circuit to any desired dispensing element, current-responsive means responsive to the closure of an operating circuit to reset the actuated contacts of the control device whereby the failure of a contact or circuit element is indicated by the off-normal condition of the control device and means for maintaining energization of the selected dispensing element long enough for it to operate.

2. In a selective control means for article-handling systems of the class described and including remote-controlled article-dispensing elements, a selectively operable control device having digital sets of contacts to be operated in accordance with the assigned number of the article-dispensing element desired, electromagnetic switches connected to be selectively operated thereby to establish an operating circuit to any desired dispensing element, a current-responsive device common to all of said operating circuits and means including said device for resetting said control device in response to the operation of said electromagnetic switches.

3. In a selective control means for article-handling systems of the class described, a selectively operable control device having digital sets of contacts to be operated in accordance with the assigned number of the article-dispensing element desired, electromagnetic switches one for each of said contacts and connected to be selectively operated thereby to establish an operating circuit to any desired dispensing element and electro-responsive means in series relation with said operating circuits for indicating to the operator at said control device the effective operation of the switches and of the selected dispensing element.

4. In a selective control means for article-handling systems of the class described, a selectively operable control device having digital sets of contacts to be operated in accordance with the assigned number of the article-dispensing element desired, electromagnetic switches connected to be selectively operated thereby to establish an operating circuit to any desired dispensing element, means including an electromagnet common to all of the operating circuits for resetting said control device in response to the closure of any operating circuit at the completion of the selecting cycle and manually operable means for resetting said control device in case the selecting cycle is not completed.

5. In a selective control means for article-handling systems of the class described and including a series of dispensing elements, electromagnetic switches having contacts in circuit with said elements and selectively operable means for variably controlling said switches to operate any desired one of said elements by energization of predetermined ones of said switches, differing in identity for each different selection, said last-mentioned means comprising two control devices each effective to control said switches to operate any one of the dispensing elements, one of said control devices embodying manually operable keys and the other involving card-reading elements for control by a card or similar control form, said last-mentioned card-control device further embodying switch means operated by the insertion of the card in the card-reading elements for rendering the other control device ineffective to control said first-mentioned switches in circuit with said dispensing elements.

6. In article-handling systems including a multiplicity of dispensing elements and selective circuit-closing means for operating any desired ones of said elements, said circuit-closing means comprising groups of multicontact relays including a "tens" group, duplicate "hundreds" groups and a plurality of "thousands" relays, and operating circuits therefor, the operating circuits for all of the "hundreds" relays in each "hundreds" group including contacts of one of the "thousands" relays which is individual to the particular "hundreds" group.

7. In a selective control system for article-handling systems of the class described and including a series of dispensing elements, electromagnetic switches arranged in "tens" and "hundreds" and "thousands" groups, each of said switches being provided with contacts which are closed when the switch is energized, individual operating circuits for said dispensing elements including said contacts of the switches of the "tens" and "hundreds" groups, a selective circuit-closing device having "units," "tens," "hundreds" and "thousands" contacts, circuits connecting the "units" contacts of said circuit-closing device to the contacts of said "tens" group of switches, operating circuits for the "tens" and "thousands" switches including the "tens" and "thousands" contacts of said circuit-closing device and operating circuits for the switches of the "hundreds" group including contacts of the switches in the "thousands" group and the "hundreds" contacts of said circuit-closing device.

8. In article-handling systems including a multiplicity of dispensing elements, a plurality of groups of multicontact relays, circuits for operating each of said dispensing elements, said circuits including the contacts of certain of said relays, selective control means for variably operating said relays to operate any desired ones of the dispensing elements, and an electroresponsive device common to all of said operating circuits for resetting the selective control means to normal in response to the closure of each one of the said circuits.

9. In article-handling systems including a multiplicity of dispensing elements, a plurality of groups of multicontact relays, circuits for operating each of said dispensing elements, said circuits including the contacts of certain of said relays, a source of current and selective control means to connect said source to said relays and operating circuits for variably operating said relays to operate any desired ones of the dispensing elements, said selective control means comprising digital sets of latching keys, means for latching said keys in the actuated position and means for unlatching the keys, said unlatching means including an electromagnet in series relation with said source and the keys of said selective control means.

10. In article-handling systems including a multiplicity of dispensing elements and selective circuit-closing means for operating any desired ones of said elements, a card control device for controlling said selective circuit-closing means in accordance with perforations in a card or control form, said control device comprising contacts operated by the insertion of a card therein, means in circuit with said contacts to operate said control device to effect control of said circuit-closing means and means for resetting said control device and releasing the cards only after completion of selecting function to energize the selected dispensing element.

11. In a selective control system for article-handling systems of the class described and including a series of article-dispensing elements, digital groups of circuit-closing contacts including "units," "tens" and "hundreds" groups, a plurality of "hundreds" electromagnetic switches one for each contact of the "hundreds" group, a plurality of "tens" electromagnetic switches one for each contact of the "tens" group, means for selectively energizing "tens" and "hundreds" switches in accordance with the operation of the corresponding contacts of the "tens" and "hundreds" groups, operating circuits one for each of the dispensing elements and extending from the switch contacts of the "hundreds" switches, circuits connecting one hundred contacts of the "hundreds" switches in multiple to contacts of the "tens" switches, ten to the ten contacts of the first "tens" switch, ten to the ten contacts of the second "tens" switch and so forth, and circuits connecting the ten cooperating or engaging contacts of each "tens" switch in multiple to the ten contacts of the "units" digital group, whereby the separate individual operating circuits for the dispensing elements are selectively closed by closure of one "units" contact, one "tens" contact and its associated electromagnetic switch and one "hundreds" contact and its associated electromagnetic switch.

PAUL M. FARMER.

REFERENCES CITED

The following references are of record in the file of this patent:

UNITED STATES PATENTS

| Number | Name | Date |
| --- | --- | --- |
| 1,218,015 | Tarbox | Mar. 6, 1917 |
| 1,587,121 | Harlow | June 1, 1926 |
| 1,635,452 | Zsoldos | July 12, 1927 |
| 1,709,430 | Hentzschel | Apr. 16, 1929 |
| 1,786,805 | Wensley | Dec. 30, 1930 |
| 1,816,887 | Adams | Aug. 4, 1931 |
| 1,864,074 | Krum | June 21, 1932 |
| 1,867,048 | Abel | July 12, 1932 |
| 1,976,398 | Hoover | Oct. 9, 1934 |
| 2,013,012 | Tauscheck | Sept. 3, 1935 |
| 2,053,749 | Steeneck | Sept. 8, 1936 |
| 2,189,001 | Gould | Feb. 6, 1940 |
| 2,282,164 | Buswell | May 5, 1942 |